United States Patent [19]
Kivolowitz

[11] Patent Number: 5,881,321
[45] Date of Patent: Mar. 9, 1999

[54] CAMERA MOTION SENSING SYSTEM

[75] Inventor: Perry Kivolowitz, Madison, Wis.

[73] Assignee: Cammotion, Inc.., Madison, Wis.

[21] Appl. No.: 853,871

[22] Filed: May 9, 1997

[51] Int. Cl.[6] .................................................. G03B 17/24
[52] U.S. Cl. .............................. 396/53; 396/429; 352/85; 352/131; 348/61
[58] Field of Search ................................ 396/52, 53, 429, 396/7, 8; 352/85, 87, 131; 348/113, 114, 61, 116

[56] References Cited

U.S. PATENT DOCUMENTS

| | | | |
|---|---|---|---|
| 4,855,822 | 8/1989 | Narendra et al. | 348/114 |
| 5,187,754 | 2/1993 | Currin et al. | 382/284 |
| 5,508,736 | 4/1996 | Cooper | 348/144 |
| 5,604,534 | 2/1997 | Hedges et al. | 348/113 |
| 5,642,285 | 6/1997 | Woo et al. | 352/131 |

OTHER PUBLICATIONS

Verplaetse, C., "Inertial proprioceptive devices: Self–motion–sensing toys and tools", IBM System Journal, vol. 35, Nos. 3 & 4, 1996, pp. 639–650.

CYBERSET O™ High–end Virtual Dimensions for TV ORAD Hi–Tec Systems.

*Primary Examiner*—David M. Gray
*Attorney, Agent, or Firm*—Burns, Doane, Swecker & Mathis, L.L.P.

[57] ABSTRACT

Inertial sensors are incorporated into the structure of a motion picture or video camera, to detect its movement along three orthogonal axes, as well as angular rotation about the three axes. Linear and angular acceleration detected by the sensors is transmitted from their location on the camera to a remote site by means of wireless communication. A time code is coupled with the data from the sensors, so that the instantaneous position of the camera can be determined for any point in time during the recording of live action. At the remote site, the sensor data is processed to determine absolute camera position, and provided to an image generating system, to thereby facilitate real-time generation of images that are consistent with the scene being recorded.

41 Claims, 2 Drawing Sheets

CAMERA MOTION SENSING SYSTEM

FIELD OF THE INVENTION

The present invention is generally directed to the production of motion pictures and video sequences, and more particularly to the tracking of the position of a camera during the production of motion pictures and video sequences.

BACKGROUND OF THE INVENTION

In the modern-day production of motion pictures, the use of special effects is becoming much more common. Some types of special effects involve the merging of a "live" shot of an actor or scene with a computer-generated image. One example of this type of effect employs a virtual set, or virtual studio, in which an actor is filmed, or taped, while performing in front of a so-called "blue screen", which provides a background of a uniform color that can be easily filtered out during subsequent production processes. The recorded motions of the actor can then be superimposed on a computer-generated scene, to provide the final result.

In another type of special effect, a computer-generated element is merged into the image that has been recorded by the camera. For example, a recorded scene may contain a background building that is only a few stories tall. To create the impression that the building is much taller, a computer-generated image of several more stories can be added to the original image of the building. As another example, an animated character can be incorporated into a scene.

In the production of these types of special effects, it is necessary to know the position of the camera during the recording of the live action. For example, if the camera moves from a position directly in front of an actor to an oblique angle, the perspective from which the computer-generated scene is viewed in the final image must change in a commensurate manner, to provide a realistic impression. In other words, the rendering of the computer-generated image at every instant in time must be consistent with the location and orientation of the camera during the filming of live action at that same instant.

In the past, the recording of the camera's position has been carried out in several different ways. In one approach, a special virtual set is constructed whose walls contain gradations that can be optically sensed and processed to provide position information. For example, a unique pattern of gradations can be marked on the blue screen which forms a wall of the virtual set. By using pattern recognition techniques, the location and orientation of the camera can be determined at all times. One example of this type of virtual set is the CYBERSET O sold by Orad Hi-Tech Systems, Ltd. This approach to camera position sensing is restricted to use within the specially constructed studio, and therefore cannot be employed when filming scenes outdoors, or in any interior environment other than a virtual set.

To avoid the limitations of having to use a virtual set, another optically-oriented approach employs image processing techniques to recognize objects in a scene. By interpreting the relative sizes and positions of objects in the recorded scene, the location and orientation of the camera can be determined. This technique is difficult to implement at a practical level, however, and therefore is not regularly employed.

In another known approach, the camera is mounted upon a rigid, encoder-equipped platform. The encoders on the platform enable the position of the camera to be precisely monitored at all times. The advantage offered by this approach is that it can be used outdoors, for example by placing the platform in the area where a scene is to be filmed. However, since the camera is required to be mounted on a rigid structure at all times, this approach is not suitable for hand-held cameras and the like. As a result, restrictions are placed on the range of movement of the camera during the filming of the scene.

It is an objective of the present invention, therefore, to provide a system for accurately sensing the position of a camera which can be readily used in conjunction with hand-held cameras, and yet which does not require a special environment, such as a blue-screen studio, and therefore can be used to record almost any type of action and/or scene.

BRIEF STATEMENT OF THE INVENTION

In accordance with the present invention, this objective is achieved by incorporating or attaching a six-axis encoder into or on the structure of a camera. In a preferred embodiment of the invention, inertial sensors are mounted on the camera to detect its movement along three orthogonal axes, as well as angular rotation about the three axes. Linear and angular acceleration detected by the sensors is transmitted from their location on the camera to a remote site, preferably by means of wireless communication. A time code is coupled with the data from the sensors, so that the instantaneous position of the camera can be determined for any point in time during the recording of live action. In addition, other information which may be relevant to the scene being recorded, such as the camera's operating parameters, can also be transmitted.

At the remote site, the sensor data is processed, as necessary, to determine absolute camera position, and can be provided to an image generating system, to thereby facilitate real-time generation of images that are consistent with the scene being recorded. Alternatively, or in addition, the information relating to the camera's position at each instant of time can be stored in a suitable memory, for subsequent post-processing applications.

By means of this self-contained arrangement, the need to rely upon external environmental factors is eliminated, thereby enabling the position of the camera to be accurately sensed in almost any type of situation. Significantly, the system of the present invention can be employed to sense the position of a hand-held camera, even when it is used outdoors over moderate distances, thereby eliminating the need for special mounting structures and/or specially equipped studios.

The foregoing features of the invention, and the advantages provided thereby, are described in greater detail hereinafter with reference to an embodiment of the invention illustrated in the accompanying drawings.

DETAILED DESCRIPTION

To facilitate an understanding of the present invention and its applications, it is described hereinafter with particular reference to its use in the context of the production of motion pictures. It will be appreciated, however, that the practical applications of the invention are not limited to this particular embodiment. For example, in addition to motion pictures that are recorded on film, the invention can be employed in connection with television and similar types of video productions, as well as other multi-media applications. In general, the concepts which underlie the invention can be employed in any situation in which a hand-held camera is used. It will be appreciated, therefore, that the following description is illustrative, rather than being restrictive of the principles that define the invention.

Figure 1:
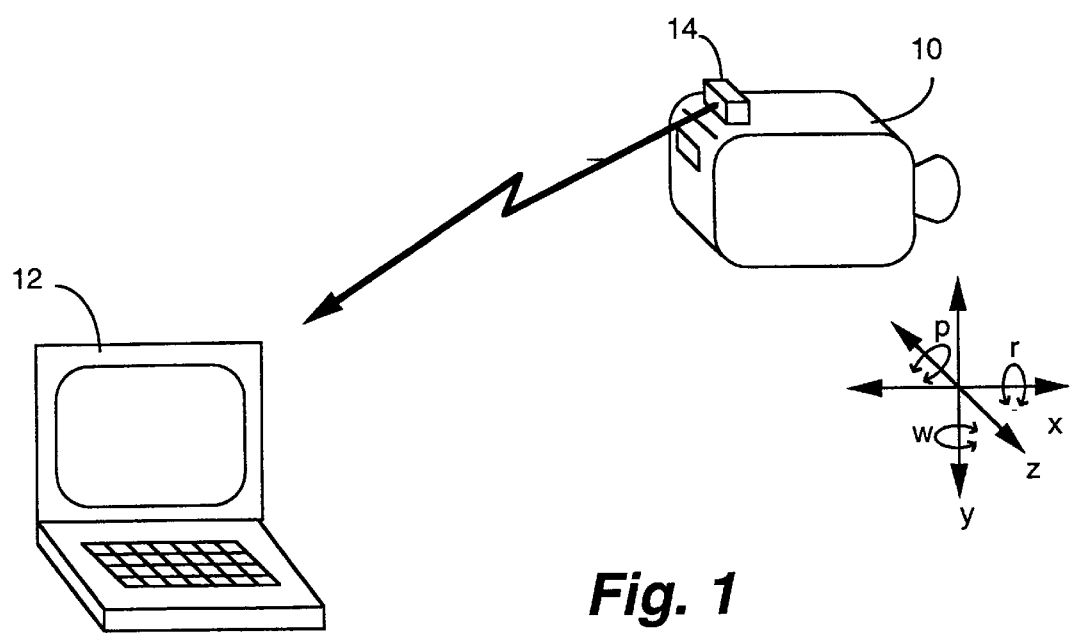
FIG. 1 is a general perspective view of the major components of a camera position tracking system in accordance with the present invention.

Referring to FIG. 1, the main components which constitute a camera motion-sensing system in accordance with the present invention comprise the camera 10 itself, and a remote processing station 12. Mounted on the camera 10 is a set of inertial sensors. In one embodiment of the invention, the camera 10 can be any suitable pre-existing type of film or video camera that is suitable for the scene to be recorded. For example, the camera can be of the relatively compact, hand-held type. In the context of the present invention the term "hand-held" refers not only to cameras that are physically held in one or both hands of the camera operator, but also includes other types of mobile cameras that are supported on or by the camera operator's body. Thus, for example the term may refer to a shoulder-mounted camera or a "steadycam" type of camera that is supported by, and moves with, the camera operator.

If a pre-existing camera is employed, the inertial sensors can be retro-fitted to the body of the camera. In the example of FIG. 1, the inertial sensors are contained within a suitable housing 14 that is attached to the exterior of the camera's body. It will be appreciated, of course, that the inertial sensors can be incorporated into the structure of the camera, rather than being externally mounted as illustrated in FIG. 1. The inertial sensors function to detect translational movement of the camera along three orthogonal axes, respectively labelled x, y and z, and to detect rotational movement of the camera about these three axes, or another set of three orthogonal axes. The three directions of rotational movement are labelled roll r (rotation about the x axis), yaw w (rotation about the y axis) and pitch p (rotation about the z axis). To minimize the impact of the sensors on the size and weight of the camera, they are preferably of the microelectronic variety.

Figure 2:
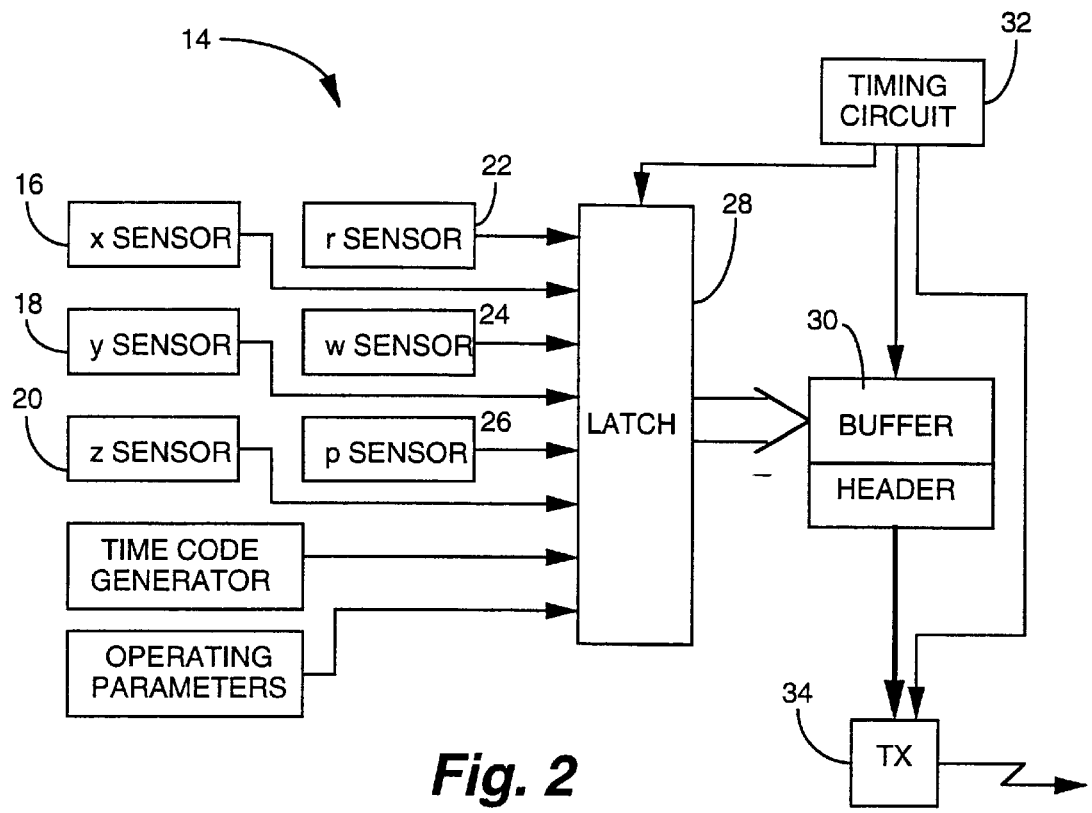
FIG. 2 is a schematic block diagram of the camera-mounted components of the position sensing system.

A detailed view of the components contained within the housing 14 is illustrated in FIG. 2. Referring thereto, the housing contains three accelerometers 16, 18 and 20 for respectively sensing linear motion of the camera along each of the x, y and z translational axes. Also included are three gyroscopes 22, 24 and 26 for sensing rotational movement of the camera about these three axes. In the illustrated embodiment, only one sensor is associated with each of the six directions of motion. In practice, however, it may be desirable to employ multiple sensors for each of the different directions of movement, to provide greater accuracy. For example, two or more accelerometers might be employed to sense translational movement along each of the x, y and z axes. If the accelerometers are of the same type, the average of their output signals can be used to indicate the movement of the camera along the associated axis. Conversely, it may be preferably to employ different types of accelerometers. For example, one accelerometer might be of the piezoelectric or piezoresistive type, whereas another accelerometer may be of the capacitive type. In this case, the output signals of the different types of accelerometers can be combined in a manner which accentuates their respective advantages. In a similar manner, different types of gyroscopes can be employed to sense the rotational movement of the camera about each of the respective axes.

The output signals generated by each of the inertial sensors are fed to a latch circuit 28. In addition, signals relating to various operating parameters of the camera can also be supplied to the latch circuit. In the context of creating special effects, the focal length of the camera may be relevant, to determine the magnification factor that is to be employed for a corresponding computer-generated image. Other operating parameters of the camera which may be relevant to the generation of the image, such as the focal distance or aperture, can also be stored in the latch. In addition, environmental factors which may have an affect on the measurements, such as temperature can be included in the stored data.

To facilitate editing and the creation of special effects, it is a common practice to record a time code on the film or video tape along with the image being recorded. Specifically, a universal time code is globally employed in connection with all components of a motion picture production. This universal time code, known as the SMPTE time code, is typically magnetically recorded on the film or tape at the time that a scene is being recorded. In accordance with the present invention, the time code is also supplied to the latch circuit 26, to be stored therein.

At regular intervals, the latch circuit 28 latches each of the input signals applied thereto, and forwards them to a buffer circuit 30 for subsequent transmission. The latching of the input signals, and subsequent transfer to the buffer circuit 30, is controlled by means of a timer circuit 32. In the preferred embodiment of the invention, the timer circuit causes the input signals to be latched at a frequency of 120 Hz. This particular frequency is desirable because it represents the lowest common multiple of the frame rates for video and motion picture recording. More particularly, in the NTSC format, video information is recorded at a rate of 30 frames per second. In contrast, motion picture filming is carried out at a rate of 24 frames per second. To provide compatibility with each of these frame rates, therefore, the input signals from the inertial sensors, the camera operations, and the time code generator are sampled at a rate of 120 Hz, to provide four samples per video frame and five samples per motion picture frame.

After each of the input signals is sampled by the latch circuit 28 and forwarded to the buffer 30, suitable header information is added to the sample data to form a packet, which is then forwarded to a transmitter 34 for communication to the remote processing station 12. The header information which is added in the buffer 30 can include an address for the remote processing station 12, and any other appropriate synchronizing information that is associated with wireless communications. Preferably, the transmitter 34 transmits the packets of data using suitable conventional wireless communication technology, to thereby provide reliable transmission over moderate distances, e.g. up to a few miles. As a result, the camera can be used to record actions involving a great deal of movement, e.g. a chase scene, and transmit the camera position information to the remote processing station 12 which is some distance away.

Figure 3:
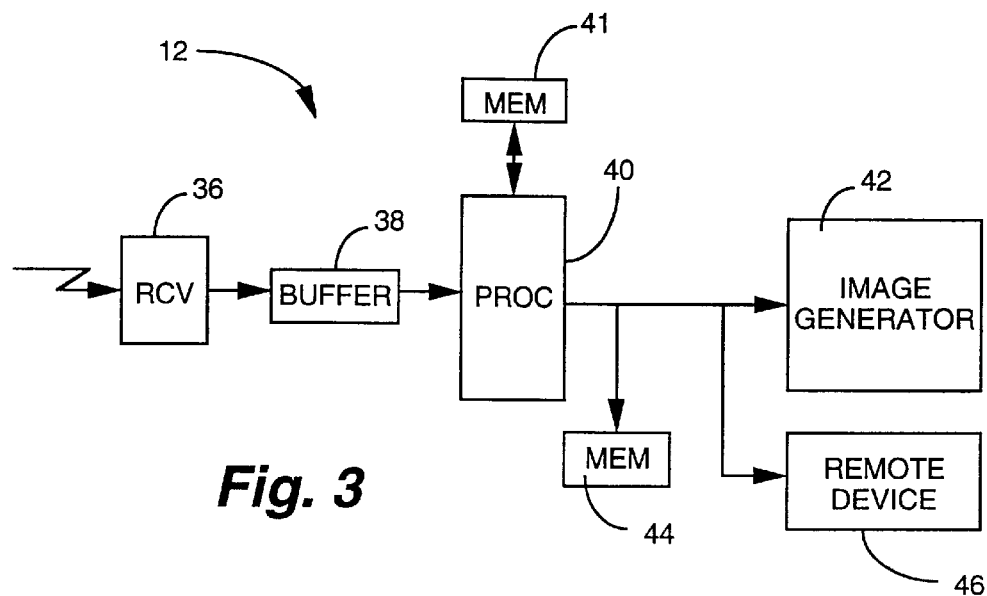
FIG. 3 is a schematic block diagram of the components of the camera position sensing system that are located at the remote site.

In one implementation, the remote processing station 12 can be embodied in a portable laptop computer, or similar such device, having a wireless communication receiver. The components of the remote processing station are illustrated in the block diagram of FIG. 3. Referring thereto, signals transmitted from the camera are received at a wireless communication receiver 36, and the data packets are stored in a buffer 38. Each of the individual items of data within the data packet, corresponding to the input signals presented to the latch circuit 28, is provided to a processor 40. In operation, the inertial sensors 16–26 produce output signals which represent changes in the position of the camera. To determine the absolute position of the camera, therefore, it is necessary to integrate the successive signals received from the sensors. Associated with the processor 40 is a suitable memory 41, e.g. RAM, in which the previously calculated values for each of the six degrees of position is stored. Each time a new data packet is received, the new values are integrated with the previously stored values, to compute the most current position of the camera. The processor 40 generates an output signal which is indicative of the camera's position, as well as the time code value associated with that calculated position.

In the illustrated embodiment, the processing of the sensor signals to determine absolute position is carried out at the remote site. In an alternate embodiment, the processor can be included with the camera as well, to integrate the sensor signals. In this case, therefore, the data packets that are transmitted to the remote site identify the actual position of the camera, rather than changes in position.

Since the signals generated by the inertial sensors only relate to changes in position, and not absolute position, it is preferable to provide an initial position reference from which absolute position can be reliably computed on a repeatable basis from the sensor signals. For example, at the beginning of the recording of a scene, the camera can be placed in a support jig which holds the camera in a predetermined location and orientation. Once the camera is placed in this position, the sensors can then be activated, so that all motion which is sensed from that point on will be transmitted to the remote processing site 12, and the absolute position of the camera relative to the scene will be known at all times.

In the preceding example, the time code is generated in the camera and transmitted to the remote processing site with the sensor data. In an alternative implementation, the time code can be generated at the remote processing station 12, or received from a different external source, and associated with the data packets at the time they are received at the station 12.

The output signal generated by the processor 40 can be employed in a number of different ways. In one implementation of the invention, computer generated images are produced in real time, i.e. simultaneously with the filming of the action by the camera 10. In this situation, the camera position signal is fed directly to a computer image generator 42, to provide the appropriate view angle and zooming factor for the generation of the image. The image generator can be incorporated into the same computer that receives the sensor signals and calculates the camera's position, or in a separate system that is coupled thereto.

In another implementation of the invention, the computer-generated images are produced during a subsequent phase of the motion picture production. In this situation, the camera position data, together with the associated time codes and camera parameters, are stored in a suitable memory 44, such as a magnetic disk. It will be appreciated that this data can be stored in the memory 44 during the real-time implementation as well, for post-processing purposes.

In a further implementation of the invention, the camera position data might be used to control a remotely located device. For example, in a simulation environment, it may be desirable to track the movements of a hand-held camera, so that the motion of a remotely located camera, or other type of viewing device, can be controlled in a commensurate manner. In this situation, the output signals from the position processor 40 are supplied to the remote device 46, for control of its movement.

From the foregoing, it can be seen that the present invention provides a system for tracking the movement of a camera which is incorporated into the structure of the camera itself, and thereby obviates the need for external environmental components. Since the motion sensing system is self-contained within the camera, it can be readily employed with hand-held cameras, and thereby provide almost limitless freedom of movement of the camera, both indoors and outdoors. Furthermore, since the system does not rely upon optical processing of landmarks to determine camera position, it facilitates filming under low-light conditions or other conditions in which optical methods cannot be employed.

It will be appreciated by those of ordinary skill in the art that the present invention can be embodied in other forms without departing from the spirit or essential characteristics thereof. The presently disclosed embodiment is therefore considered in all respects to be illustrative, and not restrictive. The scope of the invention is indicated by the appended claims, rather than the foregoing description, and all changes that come within the meaning and range of equivalence thereof are intended to be embraced therein.

What is claimed:

1. A system for detecting the position of a camera comprising:
   a camera having a plurality of inertial sensors which respectively generate output signals indicative of movement of the camera in six directions of movement;
   a processing unit for processing the output signals generated by said inertial sensors to provide position information pertaining to the instantaneous location and orientation of the camera;
   a wireless communication device for transmitting position-related data based upon the output signals generated by said inertial sensors from the camera to a remote site;
   means for associating a time reference with the position information provided by said processing unit; and
   a memory unit for storing said position information and associated time reference at said remote site.

2. The system of claim 1 wherein said associating means is located in said camera, and said wireless communication device transmits time reference data together with said position related data.

3. The system of claim 1 wherein said associating means is located at said remote site.

4. The system of claim 1 wherein said inertial sensors comprise at least three accelerometers for respectively sensing linear movement of said camera along three orthogonal axes, and at least three gyroscopes for respectively sensing rotational movement of said camera about three orthogonal axes.

5. The system of claim 1 wherein said wireless communication device also transmits data relating to an operating parameter of said camera, together with said position-related data.

6. The system of claim 5 wherein said operating parameter is the focal length of a lens on the camera.

7. The system of claim 5 wherein said operating parameter is the focal distance.

8. The system of claim 5 wherein said operating parameter is an aperture value for the camera.

9. The system of claim 5 wherein said operating parameter is temperature.

10. The system of claim 1 wherein said processing unit is located at said remote site, and said position related data includes the output signals from said inertial sensors.

11. The system of claim 1 wherein said processing unit is located on the camera, and said position-related data comprises said position information.

12. The system of claim 1 comprising at least two inertial sensors for each of said six directions of movement.

13. The system of claim 12 wherein the two sensors for sensing a given direction of movement are of the same type, and said information is based on an average of their respective output signals.

14. The system of claim 12 wherein the two sensors for sensing a direction of movement are of different types.

15. A system for detecting the position of a camera comprising:
- a camera having a plurality of inertial sensors mounted thereon which respectively generate output signals indicative of linear movement of the camera along three orthogonal axes and rotational movement of the camera about three orthogonal axes;
- a processing unit for processing the output signals generated by said inertial sensors to provide information pertaining to the instantaneous position and orientation of the camera;
- a wireless communication device for transmitting position-related data based on the output signals generated by said inertial sensors from the camera to a remote site, and additional data relating to an operating parameter of said camera; and
- a memory unit at said remote site for storing said position information.

16. The system of claim 15 wherein said inertial sensors comprise at least three accelerometers for respectively sensing said linear movement of said camera along three orthogonal axes, and at least three gyroscopes for respectively sensing said rotational movement of said camera about three orthogonal axes.

17. The system of claim 15 wherein said operating parameter is the focal length of a lens on the camera.

18. The system of claim 15 wherein said operating parameter is the focal distance.

19. The system of claim 15 wherein said operating parameter is an aperture value for the camera.

20. The system of claim 15 wherein said operating parameter is temperature.

21. The system of claim 15 wherein said processing unit is located at said remote site, and said position related data includes the output signals from said inertial sensors.

22. The system of claim 15 wherein said processing unit is located on the camera, and said position-related data comprises said information pertaining to the instantaneous position and orientation of the camera.

23. The system of claim 15 comprising at least two inertial sensors for each of said directions of movement along and about said axes.

24. The system of claim 23 wherein the two sensors for sensing a given direction of movement are of the same type, and said information is based on an average of their respective output signals.

25. The system of claim 23 wherein the two sensors for sensing a direction of movement are of different types.

26. A system for facilitating the creation of special effects, comprising:
- a camera having a plurality of inertial sensors mounted thereon which respectively generate output signals indicative of linear movement of the camera along three orthogonal axes and rotational movement of the camera about three orthogonal axes;
- a processing unit for processing the output signals generated by said inertial sensors to provide information pertaining to the instantaneous position and orientation of the camera;
- a wireless communication device for transmitting position-related data based upon the output signals generated by said inertial sensors from the camera to a remote site; and
- an image generating unit which receives said position information and generates a graphic image having a view angle which corresponds to said position and orientation information.

27. The system of claim 26 wherein said wireless communication device also transmits data relating to the focal length of a lens of said camera, together with said position-related data, and said image generating unit generates said graphic image at a magnification factor corresponding to said focal length.

28. The system of claim 26 wherein said processing unit is located at said remote site, and said position related data includes the output signals from said inertial sensors.

29. The system of claim 26 wherein said processing unit is located on the camera, and said position-related data comprises said position and orientation information.

30. The system of claim 26 wherein said inertial sensors comprise at least three accelerometers for respectively sensing said linear movement of said camera along three orthogonal axes, and at least three gyroscopes for respectively sensing said rotational movement of said camera about three orthogonal axes.

31. The system of claim 26 wherein said wireless communication device also transmits data relating to an operating parameter of said camera, together with said position-related data.

32. The system of claim 31 wherein said operating parameter is the focal length of a lens on the camera.

33. The system of claim 31 wherein said operating parameter is the focal distance.

34. The system of claim 31 wherein said operating parameter is an aperture value for the camera.

35. The system of claim 31 wherein said operating parameter is temperature.

36. The system of claim 26, further including an SMPTE time code generator, and wherein said wireless communication device transmits the time code associated with the output signals from said inertial sensors.

37. The system of claim 30 comprising at least two inertial sensors for each of said directions of movement along and about said axes.

38. The system of claim 37 wherein the two sensors for sensing a given direction of movement are of the same type, and said information is based on an average of their respective output signals.

39. The system of claim 37 wherein the two sensors for sensing a direction of movement are of different types.

40. A camera position and orientation tracking system, comprising:
- a camera having a plurality of inertial sensors which respectively generate output signals indicative of movement of the camera in six directions of movement;

a time code generator which generates an output signal indicative of a running time code;

a processing unit which processes the output signals generated by said inertial sensors and said time code generator to compose packets of data which define the instantaneous location and orientation of the camera and the time code associated with each instance of data;

a wireless communication device for transmitting said packets of data to a remote site; and a memory unit at said remote site for storing said position information and associated time code data.

41. The system of claim 40 wherein said time code generator is located in said camera.

* * * * *